(12) United States Patent
Kawamoto

(10) Patent No.: US 7,852,363 B2
(45) Date of Patent: Dec. 14, 2010

(54) LIGHT SCANNING APPARATUS, IMAGE FORMING APPARATUS, AND LIGHT POWER CONTROL METHOD

(75) Inventor: Tomohiro Kawamoto, Abiko (JP)

(73) Assignee: Canon Kabushiki Kaisha (JP)

( * ) Notice: Subject to any disclaimer, the term of this patent is extended or adjusted under 35 U.S.C. 154(b) by 569 days.

(21) Appl. No.: 11/759,418

(22) Filed: Jun. 7, 2007

(65) Prior Publication Data
US 2007/0285494 A1    Dec. 13, 2007

(30) Foreign Application Priority Data
Jun. 9, 2006    (JP)    .............................. 2006-161645

(51) Int. Cl.
*B41J 2/435*    (2006.01)
*B41J 2/47*    (2006.01)

(52) U.S. Cl. ...................................... 347/237; 347/247

(58) Field of Classification Search ................ 347/128, 347/132, 135, 236–238, 246, 247
See application file for complete search history.

(56) References Cited

U.S. PATENT DOCUMENTS

| | | | |
|---|---|---|---|
| 6,069,645 A | * | 5/2000 | Vincent ........................ 347/246 |
| 6,144,680 A | * | 11/2000 | Kaji et al. .................. 372/38.02 |
| 7,170,536 B2 | | 1/2007 | Inagawa et al. |
| 7,199,769 B2 | * | 4/2007 | Hyuga ........................... 345/77 |
| 7,535,939 B2 | * | 5/2009 | Kawamoto et al. ...... 372/29.021 |
| 2005/0280694 A1 | * | 12/2005 | Tsujino et al. ............... 347/238 |

FOREIGN PATENT DOCUMENTS

| | | |
|---|---|---|
| CN | 1743894 A | 3/2006 |
| JP | 63-142392 A | 6/1988 |
| JP | 63-292763 A | 11/1988 |

OTHER PUBLICATIONS

Office Action dated May 8, 2009 for related Chinese application No. 200710110225.2. No translation readily available.

\* cited by examiner

*Primary Examiner*—Hai C Pham
(74) *Attorney, Agent, or Firm*—Rossi, Kimms & McDowell LLP

(57) ABSTRACT

A light scanning apparatus includes a plurality of light sources. A detection unit detects the light power of a light beam output from at least one of the plurality of light sources. A control unit controls the driving current of at least one selected light source on the basis of the detection result by the detection unit such that the light power of the selected light source equals a target light power. The light source is selected from the plurality of light sources on the basis of the light-emitting characteristic of each light source. The control unit controls, on the basis of the driving current of the selected light source, the driving currents of light sources which remain unselected in the plurality of light sources.

6 Claims, 12 Drawing Sheets

LIGHT SCANNING APPARATUS, IMAGE FORMING APPARATUS, AND LIGHT POWER CONTROL METHOD

BACKGROUND OF THE INVENTION

1. Field of the Invention

The present invention relates to a light scanning apparatus having a plurality of light sources, an image forming apparatus, and a light power control method.

2. Description of the Related Art

Conventionally, image forming apparatuses and image reading apparatuses using a plurality of light-emitting elements (light sources) have been proposed. These apparatuses execute control to maintain a predetermined amount of a light beam output from each light-emitting element. Japanese Patent Laid-Open No. 63-292763 describes an image reading apparatus which causes a plurality of LEDs to emit light sequentially and determines the light power correction value of each element to maintain a predetermined light power, thereby controlling the light power of each LED.

Japanese Patent Laid-Open No. 63-142392 describes a method which applies one of three correction data stored in a ROM in advance to a plurality of LEDs used in a printer, thereby making the light powers of the LEDs uniform.

Assume that a surface emitting laser (a surface emitting laser element which extracts a laser beam in a direction perpendicular to the active layer; also referred to as a "VCSEL") is applied as the light source of an image forming apparatus. Only one of a plurality of light-emitting points provided on the surface emitting laser is selected at random and caused to emit light to acquire data necessary for control. The light powers of the remaining light-emitting points are also controlled on the basis of this data. This method can shorten the control time necessary for light power control because light emission, data acquisition, and light power control need not be performed for each light-emitting point.

In this control method, however, the accuracy of light power control varies between the remaining beams because the light power of only one reference beam is monitored. Especially, the current-light power characteristic always varies between the light-emitting points of the surface emitting laser. Hence, the control accuracy may also vary.

FIG. 12 is a graph showing an example of current-light power characteristics in a surface emitting laser. Reference numeral 1201 denotes a characteristic of a first light-emitting point; and 1202, a characteristic of a second light-emitting point. As is apparent from FIG. 12, when the current decreases by $\Delta I$, the light power of the reference beam decreases by $\Delta P$. When the current decreases by $\Delta I$ at the second light-emitting point, the light power decreases by $\Delta P'$ that is larger than $\Delta P$. This indicates that the variation of light power changes between the light-emitting points even when the variation of current does not change. In light power control, when the light beam output from the first light-emitting point is used as the reference beam, the accuracy of light power control at the second light-emitting point relatively decreases.

Especially, the characteristic of a red surface emitting laser varies to a large extent between the light-emitting points as compared to the characteristic of an infrared surface emitting laser because of the manufacture processes, materials and physical factors. That is, in the red surface emitting laser, the accuracy of light power control more readily decreases. However, to further raise the resolution of an electrophotographic type image forming apparatus, a red surface emitting laser becomes necessary in certain situations because it can ensure a smaller spot size than an infrared surface emitting laser. It will be impossible avoid the above-described problem of light power control in the future.

SUMMARY OF THE INVENTION

It is an feature of the present invention to provide a technique of ensuring a high light power control accuracy for each of a plurality of light-emitting elements even when they have a significant variation in current-light power characteristic. Other problems will be understood throughout the specification.

The present invention is suitably implemented in, e.g., a light scanning apparatus which outputs a light beam from each of a plurality of light sources. The light scanning apparatus includes a detection unit and a control unit. The detection unit detects, e.g., the light power of a light beam output from at least one of the plurality of light sources. The control unit controls, e.g., the driving current of at least one selected light source on the basis of the detection result by the detection unit such that the light power of the selected light source equals a target light power. The light source is selected from the plurality of light sources on the basis of the light-emitting characteristic of each light source. The control unit controls, on the basis of the driving current of the selected light source, e.g., the driving currents of light sources which remain unselected in the plurality of light sources.

Further features of the present invention will become apparent from the following description of exemplary embodiments (with reference to the attached drawings).

DESCRIPTION OF THE EMBODIMENTS

An embodiment of the present invention will be described below. Individual embodiments to be described below will serve to understand various concepts including higher concepts, middle concepts, and lower concepts of the present invention. The scope of the invention is determined by the claims which follow the description and is not limited to the individual embodiments to be described below.

First Embodiment

Figure 1:
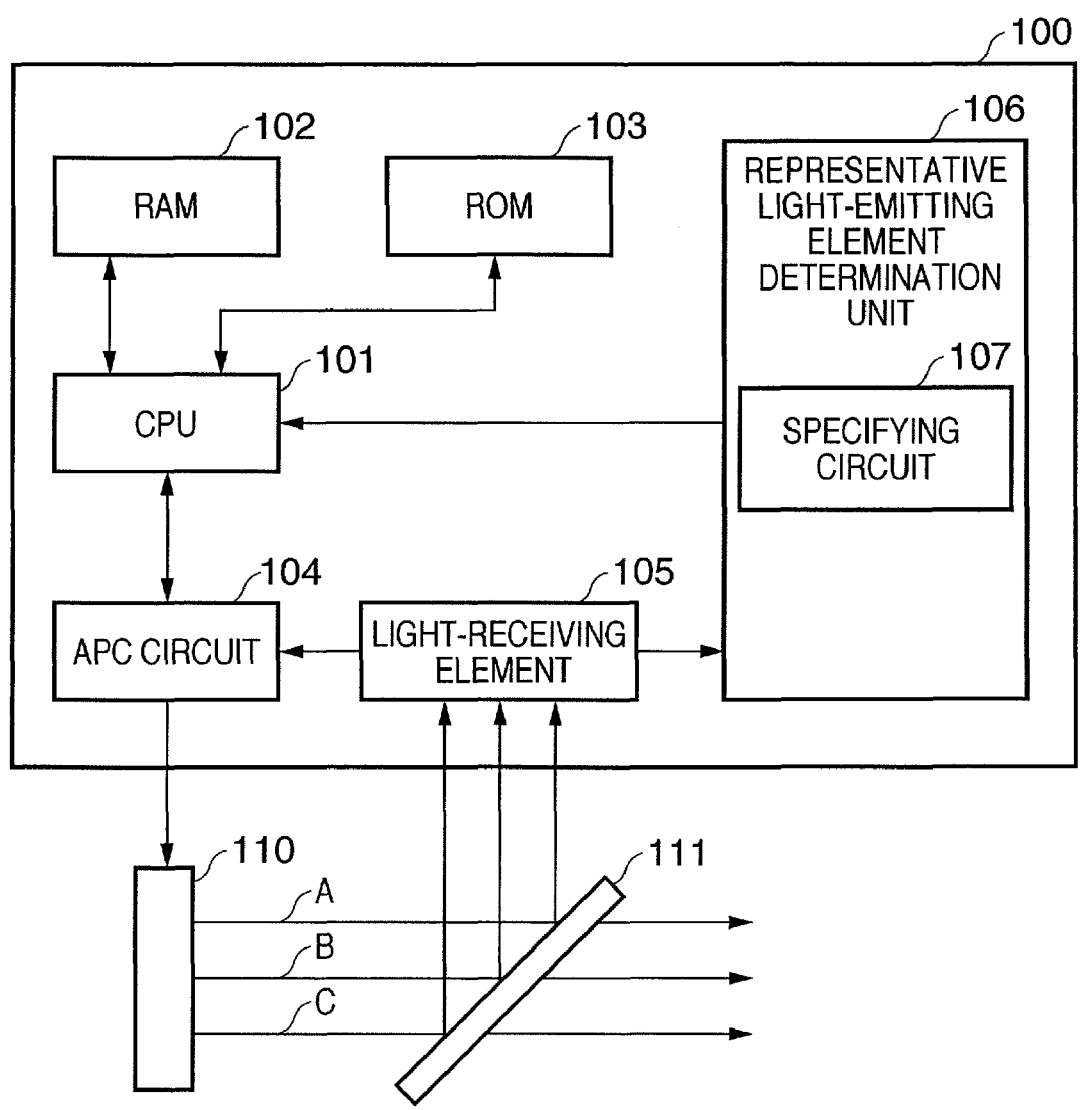
FIG. 1 is a block diagram showing an example of a light power control apparatus according to an embodiment.

FIG. 1 is a block diagram showing an example of a light power control apparatus according to an embodiment. A light power control apparatus 100 is implemented as part of, e.g., a light scanning apparatus. The light scanning apparatus can be employed as the exposure apparatus of an image forming apparatus.

A CPU 101 is a control circuit that generally controls the units included in the light power control apparatus 100. A RAM 102 is a volatile storage device that functions as a work area. A ROM 103 is a nonvolatile storage circuit that stores, e.g., a control program. An APC (Auto Power Control) circuit 104 controls the amount of light emitted by a surface emitting laser 110 having a plurality of light-emitting elements (also referred to as light-emitting points or light sources). The light-emitting elements simultaneously or individually emit light. A light-receiving element 105 receives light beams reflected by a half mirror 111.

The surface emitting laser 110 can be either an infrared surface emitting laser that emits light in the infrared wavelength range or a red surface emitting laser that emits light in the red wavelength range. The present invention will be more valuable in a red surface emitting laser. The wavelength of the output light beam is merely an example. The light beam may have any other wavelength in, e.g., the blue wavelength range. For convenience, the surface emitting laser 110 has three light-emitting elements. However, the present invention is not limited to this. The number of light-emitting elements may be two or more than four.

A representative light-emitting element determination unit 106 is a circuit to determine, on the basis of the characteristic of a light beam output from each light-emitting element, a representative light-emitting element that is preferably used as a reference for light power control. A specifying circuit 107 specifies a light-emitting element that outputs a light beam with a maximum light power when the same current flows to the light-emitting elements. The specifying circuit 107 may specify a primary light-emitting element that outputs a light beam having a maximum light power difference when the value of the current flowing to the light-emitting elements is continuously changed within a predetermined range. The specifying circuit 107 may also function as a selection circuit that selects a representative light-emitting element from among a primary light-emitting element that outputs a light beam with a maximum light power and at least one of the remaining light-emitting elements. Note that the light power of the remaining light-emitting elements does not have a significant difference from the maximum light power when the same current flows to the light-emitting elements and at least one of the remaining light-emitting elements. The determination unit 106 may be implemented by the CPU 101.

Figure 2:
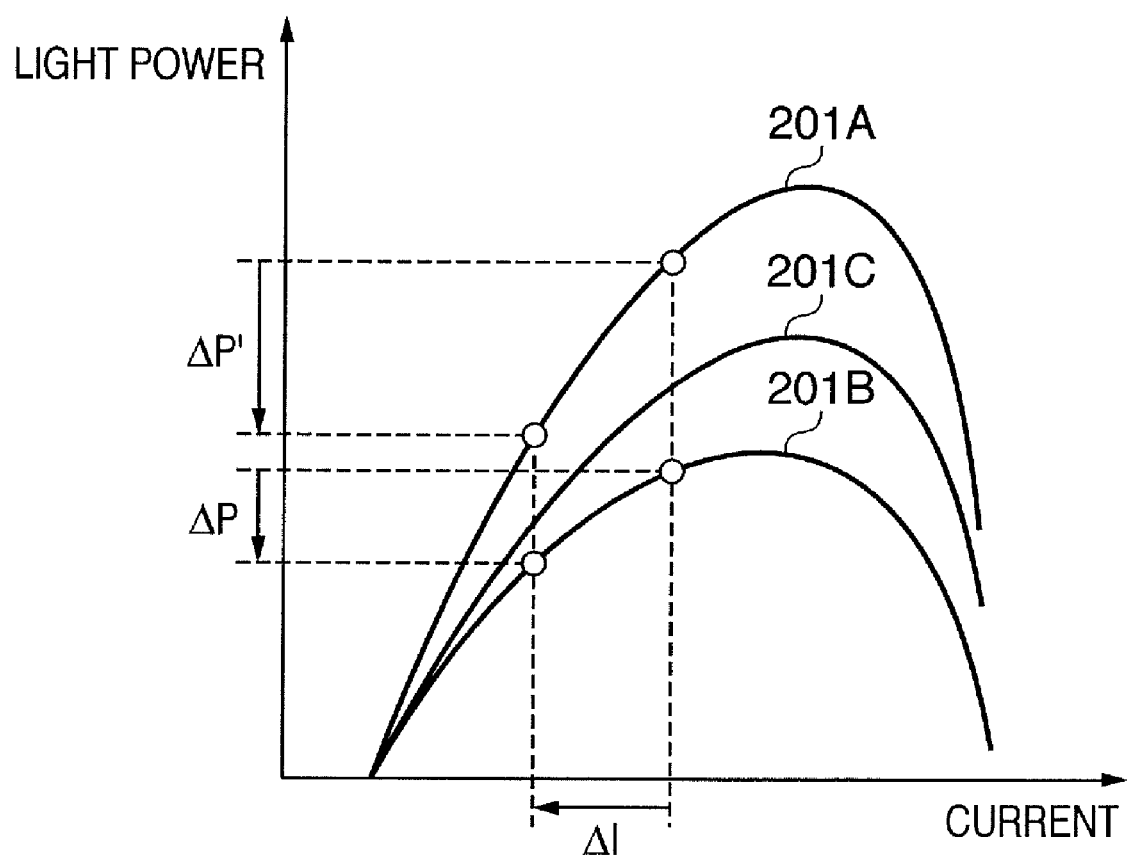
FIG. 2 is a graph showing an example of current-light power characteristics of the light-emitting elements of a surface emitting laser according to the embodiment.

FIG. 2 is a graph showing an example of current-light power characteristics of the light-emitting elements of the surface emitting laser according to the embodiment. The fundamental concept of light power control will be described with reference to FIG. 2.

Referring to FIG. 2, reference numeral 201A indicates a current-light power characteristic of a light beam 'A' output from the first light-emitting element. Reference numeral 201B indicates a current-light power characteristic of a light beam 'B' output from the second light-emitting element. Reference numeral 201C indicates a current-light power characteristic of a light beam 'C' output from the third light-emitting element. As is apparent from FIG. 2, the peak value of the light power is maximum at the first light-emitting point (light beam A). If a light-emitting element that outputs a light beam with a maximum light power when the same current flows should be selected as a reference, the determination unit 106 determines the first light-emitting point (light beam A) as the representative.

According to FIG. 2, when the current decreases by $\Delta I$, the light power of the first light-emitting element decreases by $\Delta P'$. The light power decreases by only $\Delta P$ ($<\Delta P'$) in the second light-emitting element. That is, when the light beam output from the first light-emitting element is used as a reference for light power control, the accuracy of light power control in the remaining light-emitting elements can be prevented from largely decreasing. This will be explained in more detail. The gradient of the current-light power characteristic curve of the first light-emitting element is larger than those of the remaining light-emitting elements. For this reason, when the light powers of the remaining light-emitting elements are controlled using the current-light power characteristic 201A of the first light-emitting element, the control error tends to be compressed. Conversely, when the light power of the first light-emitting element is controlled using the current-light power characteristic 201B of the second light-emitting element that has a relatively small gradient, the control error tends to increase.

Figure 3:
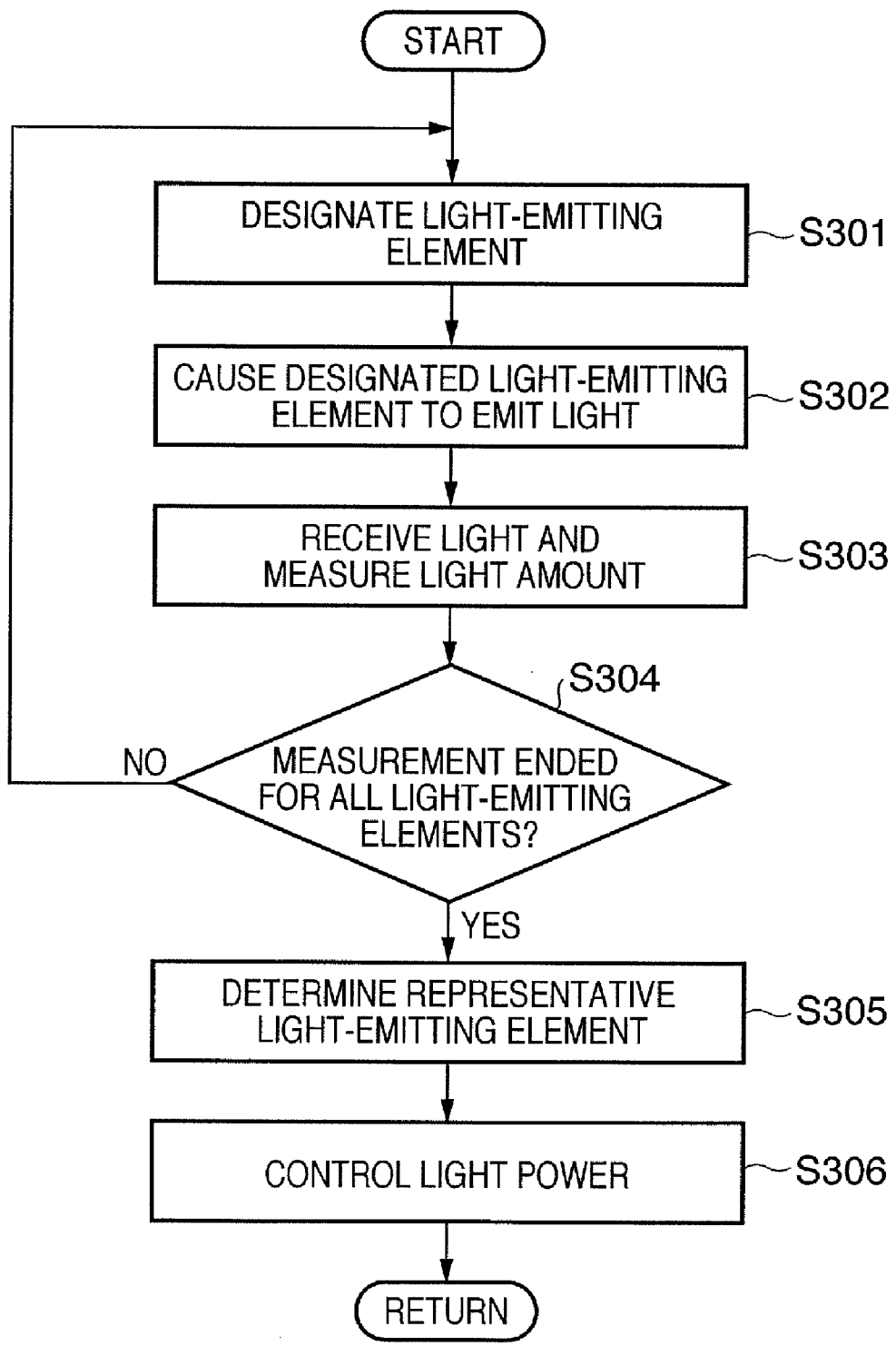
FIG. 3 is an exemplary flowchart illustrating a light power control method according to the embodiment.

FIG. 3 is an exemplary flowchart illustrating the light power control method according to the embodiment. In step S301, the CPU 101 designates light-emitting elements as light emission targets to the surface emitting laser 110 via the APC circuit 104. To cause the three light-emitting elements to sequentially emit light, the first to third light-emitting elements are designated in order. If the number of light-receiving elements equals that of light-emitting elements, light power control can be done in parallel, although the cost increases.

In step S302, the surface emitting laser 110 causes each designated light-emitting element to emit light on the basis of a predetermined current value. The predetermined current value may be designated by, e.g., the CPU 101. The current value may gradually change within a predetermined range. In this case, for example, the APC circuit 104 can incorporate a current change circuit.

In step S303, the light-receiving element 105 receives the light beam output from the designated light-emitting element and measures the light power. The determination unit 106 or CPU 101 may measure the light power. In step S304, the CPU 101 determines whether light power measurement is completed for all light-emitting elements. If YES in step S304, the process advances to step S305. If NO in step S304, the process returns to step S301 to execute measurement for the next light-emitting element.

In step S305, the determination unit 106 compares the light powers measured for the light-emitting elements and determines the representative light-emitting element on the basis of the comparison result. For example, the determination unit 106 designates a light-emitting element whose measured light power is the biggest as the representative and outputs identification information (e.g., element number) of the determined light-emitting element to the CPU 101.

In step S306, the CPU 101 instructs the APC circuit 104 to control the light power using the determined representative light-emitting element. The APC circuit 104 also controls the light powers of the remaining light-emitting elements on the basis of the light power data acquired by causing the representative light-emitting element to emit light. More specifically, the APC circuit 104 controls the driving current of the selected light source (the representative light-emitting element) on the basis of the light power detection result of the selected light source such that the light power of at least one light source selected from the plurality of light sources on the basis of the light-emitting characteristic of each light source. The APC circuit 104 controls the driving currents of the remaining unselected light sources of the plurality of light sources on the basis of the driving current of the selected light source.

Example of First Embodiment

Figure 4:
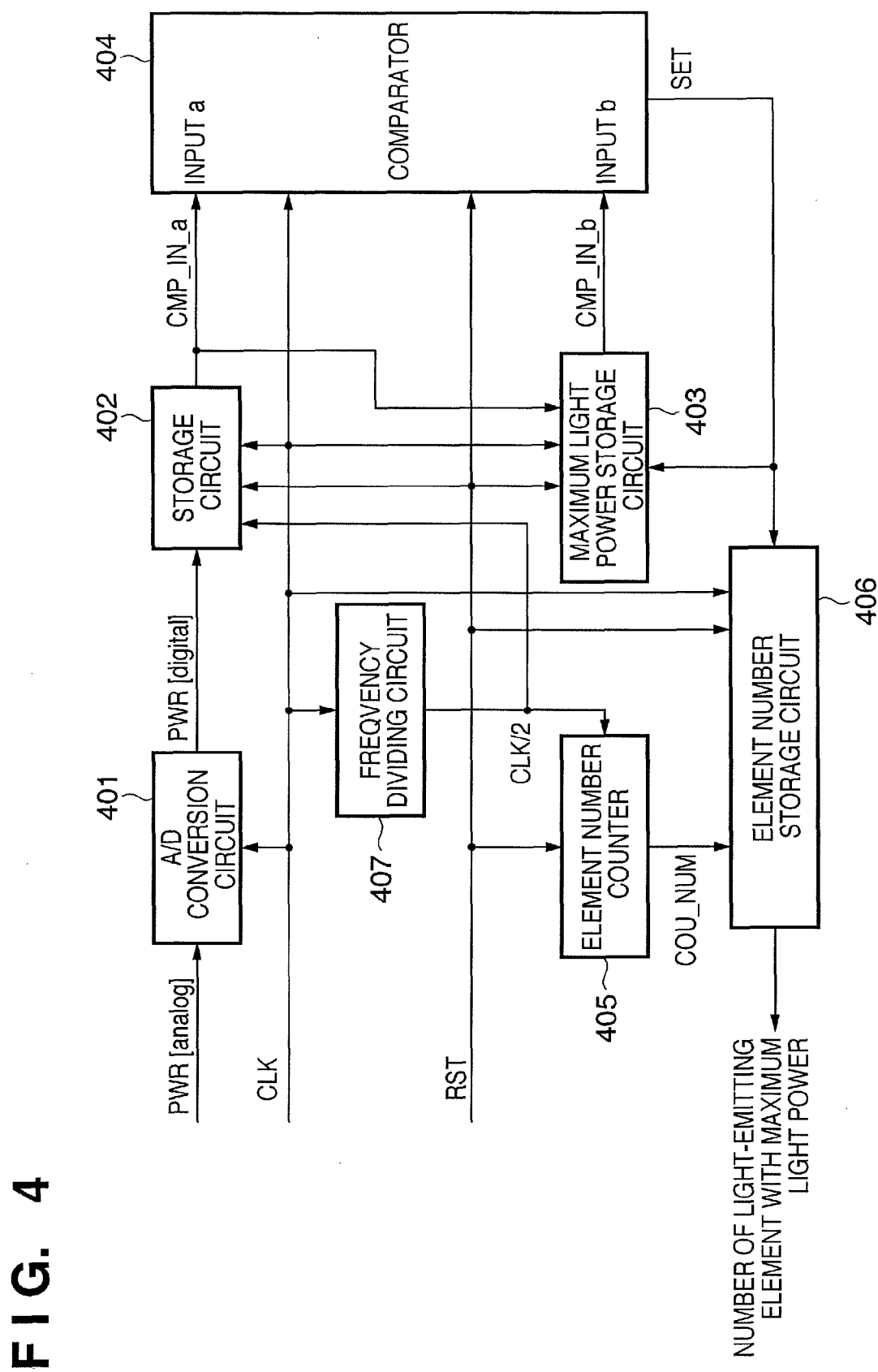
FIG. 4 is a circuit diagram showing an example of a specifying circuit according to the embodiment.

FIG. 4 is a circuit diagram showing an example of the specifying circuit according to the embodiment. An analog/digital (A/D) conversion circuit 401 converts an analog signal output from the light-receiving element 105 into a digital signal. A storage circuit 402 stores the light power data output from the A/D conversion circuit 401. A maximum light power storage circuit 403 stores the maximum light power data of a plurality of light power data. A comparator 404 compares the current light power data input from an input port a with the maximum light power data input from an input port b. If the light power data input from the input port a is larger, the comparator 404 outputs a signal to the maximum light power storage circuit 403 to store the light power data as maximum light power data. The comparator 404 also outputs a signal to an element number storage circuit 406 to store the element number at that time.

An element number counter 405 counts an element number serving as identification information of a light-emitting element that is currently outputting a light beam. The element number storage circuit 406 stores the element number of a light-emitting element that has output the light beam with the maximum light power. A frequency dividing circuit 407 divides the clock signal by, e.g., 2.

Figure 5:
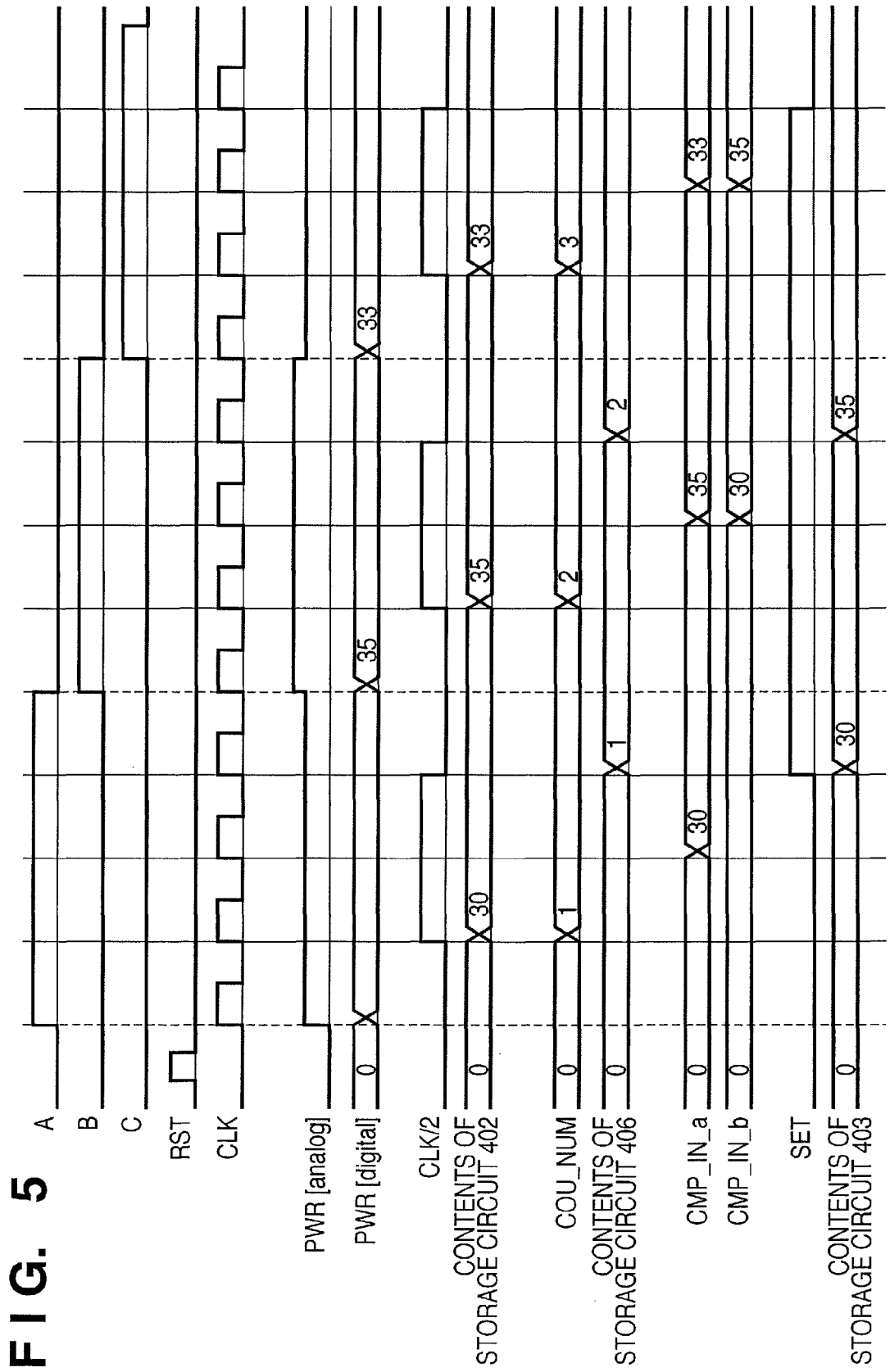
FIG. 5 is an exemplary signal sequence diagram of a method of specifying a light-emitting element with a maximum light power according to the embodiment.

FIG. 5 is an exemplary signal sequence diagram of a method of specifying a light-emitting element with the maximum light power according to the embodiment. The operation of the specifying circuit 107 shown in FIG. 4 will be described below in accordance with this sequence diagram. Assume that the surface emitting laser 110 has three light-emitting elements which output the light beams A, B, and C, respectively. Note that the light powers of the light beams A, B, and C are different from those shown in FIG. 2.

When a reset signal (RST) is input, the storage circuits 402, 403, and 406 and the counter 405 are initialized. The storage circuits are set in a read mode. The read mode and write mode of each storage circuit have a so-called complementary relationship.

When the first clock (CLK) is input, the A/D conversion circuit 401 converts the analog light power value (PWR[analog]) output from the first light-emitting element into a digital value (PWR[digital]). Assume that the light power of the light beam A is 30 mW.

When the second clock (CLK) is input, the frequency dividing circuit 407 outputs a write signal (CLK/2) to the storage circuit 402 capable of nondestructive read. The storage circuit 402 changes to the write mode and stores the light power data (PWR[digital]) of the light beam A output from the A/D conversion circuit 401. The counter 405 increments a counter value (COU_NUM) corresponding to the element number by one in accordance with an increment signal (CLK/2) output from the frequency dividing circuit 407.

When the third clock (CLK) is input, the storage circuit 402 outputs the stored light power data (30 mW) of the light beam A to the input port a of the comparator 404. The maximum light power storage circuit 403 outputs the currently stored contents (0 at this time) to the input port b of the comparator 404.

When the fourth clock (CLK) is input, the comparator 404 compares the light power data (CMP_IN_a) from the input port a with the maximum light power data (CMP_IN_b) from the input port b. If the light power data from the input port a is relatively large, the comparator 404 outputs a digital value "1" (this functions as a SET signal). Otherwise, the comparator 404 outputs "0". Since the light power data from the input port a is larger (input port a=30 mW, input port b=0 mW) at this point of time, the comparator 404 outputs a digital value "1".

Upon receiving the value "1" indicating a write enable signal (SET) from the comparator 404, the maximum light power storage circuit 403 reads out the light power data (30 mW) from the storage circuit 402 and stores it as maximum light power data. Upon receiving the write enable signal (SET), the element number storage circuit 406 reads out and stores the value (COU_NUM) indicated by the counter 405. In this case, the element number storage circuit 406 stores an element number "1" indicating the first light-emitting element that has output the light beam A.

A series of processes of specifying the light-emitting element with the maximum light power has been described above. The above-described operation is repeated a number of times equal to the number of light-emitting elements.

When the fifth clock (CLK) is input, the A/D conversion circuit 401 converts the analog light power value (PWR[analog]) of the light beam B into a digital value (PWR [digital]). Assume that the light power of the light beam B is 35 mW.

When the sixth clock is input, the frequency dividing circuit 407 outputs a write signal (CLK/2), and the storage circuit 402 stores the light power data (PWR[digital]) of the light beam B output from the A/D conversion circuit 401. Upon receiving the increment signal (CLK/2), the counter 405 increments the counter value (COU_NUM) by one.

When the seventh clock (CLK) is input, the storage circuit 402 outputs the light power data (35 mW) of the light beam B to the input port a of the comparator 404. The maximum light power storage circuit 403 outputs the stored maximum light power data (30 mW) to the input port b.

When the eighth clock (CLK) is input, the comparator 404 compares the light power data from the input port a with the maximum light power data from the input port b. Since the light power data from the input port a is larger (input port a=35 mW, input port b=30 mW), the comparator 404 outputs a digital value "1". Upon receiving the value "1" serving as a write enable signal (SET) from the comparator 404, the maximum light power storage circuit 403 stores the light power data (35 mW) stored in the storage circuit 402 as the maximum light power. Upon receiving the write enable signal (SET), the element number storage circuit 406 stores the value (COU_NUM) indicated by the counter 405 as the element number of the light-emitting element that has output the light beam with the maximum light power. In this case, the element number counter 405 stores "2". The series of operations of the second cycle is ended.

When the ninth clock (CLK) is input, the A/D conversion circuit 401 converts the analog light power value (PWR[analog]) of the light beam C into a digital value (PWR[digital]). Assume that the light power of the light beam C is 33 mW.

When the 10th clock is input, the storage circuit 402 stores the A/D-converted light power data (PWR[digital]) of the light beam C. Upon receiving the increment signal (CLK/2), the counter 405 increments the counter value (COU_NUM) by one.

When the 11th clock (CLK) is input, the storage circuit 402 outputs the light power data (33 mW) of the light beam C to the input port a of the comparator 404. The contents (35 mW) stored in the maximum light power storage circuit 403 are input to the input port b.

When the 12th clock (CLK) is input, the comparator 404 compares the light power data (33 mW) from the input port a with the maximum light power data (35 mW) from the input port b. Since the light power data from the input port b is larger now (input port a=33 mW, input port b=35 mW), the comparator 404 outputs a digital value "0". When "0" is output from the comparator 404, the contents of the maximum light power storage circuit 403 are held. Similarly, the contents of the element number storage circuit 406 are also held.

The process of specifying the number of light-emitting elements that have output the light beam with the maximum light power is ended. In this example, the element number storage circuit 406 stores the number of the second light-emitting elements that have output the light beam B. The CPU 101 reads out the element number and sets it in the APC circuit 104. The APC circuit 104 executes APC control on the basis of the light-emitting element with the maximum light power.

According to the above-described embodiment, a representative light-emitting element is determined in consideration of the current-light power characteristic of each light-emitting element. Light power control of each light-emitting element is executed on the basis of the light-emitting element. For this reason, even when the current-light power characteristic varies between the plurality of light-emitting elements, light power adjustment can be executed relatively accurately.

Especially, when a light-emitting element that outputs a light beam with a maximum light power when the same current flows to the light-emitting elements is selected as the representative light-emitting element, light power adjustment can accurately be executed.

For example, when light power control is done by using the light beam A in FIG. 2 as the reference beam, and the current is reduced by ΔI, the variation of the light power of the reference beam A is ΔP'. The variation of the light beam B is ΔP smaller than ΔP'. The variation of the light beam C is also smaller than the variation ΔP' of the reference beam A. Since the remaining light-emitting elements can be controlled more finely than before, all light-emitting elements can be controlled at a high accuracy.

The representative light-emitting element may be a light-emitting element that outputs a light beam with a maximum light power variation when the value of the current flowing to the light-emitting elements changes within a predetermined range. That is, when a light-emitting element that outputs a light beam with a maximum light power variation is used as a reference beam, the total light power control accuracy can be higher than in control based on a light-emitting element with a smaller light power variation.

Second Embodiment

The above-described embodiment employs a method of dynamically determining a representative light-emitting element capable of outputting a light beam in the maximum light power or a light power close to it. However, another method may be employed, which determines a representative light-emitting element by measuring the current-light power characteristic of each light-emitting element and stores the identification information of the representative light-emitting element in, e.g., a ROM 103 upon shipping from the factory. In this case, a determination unit 106 can easily determine which light-emitting element is the representative light-emitting element by reading gout the identification information of the representative light-emitting element from the ROM 103. This method is more advantageous than the method of dynamically determining a representative light-emitting element because the determination time can be much shorter.

Figure 6:
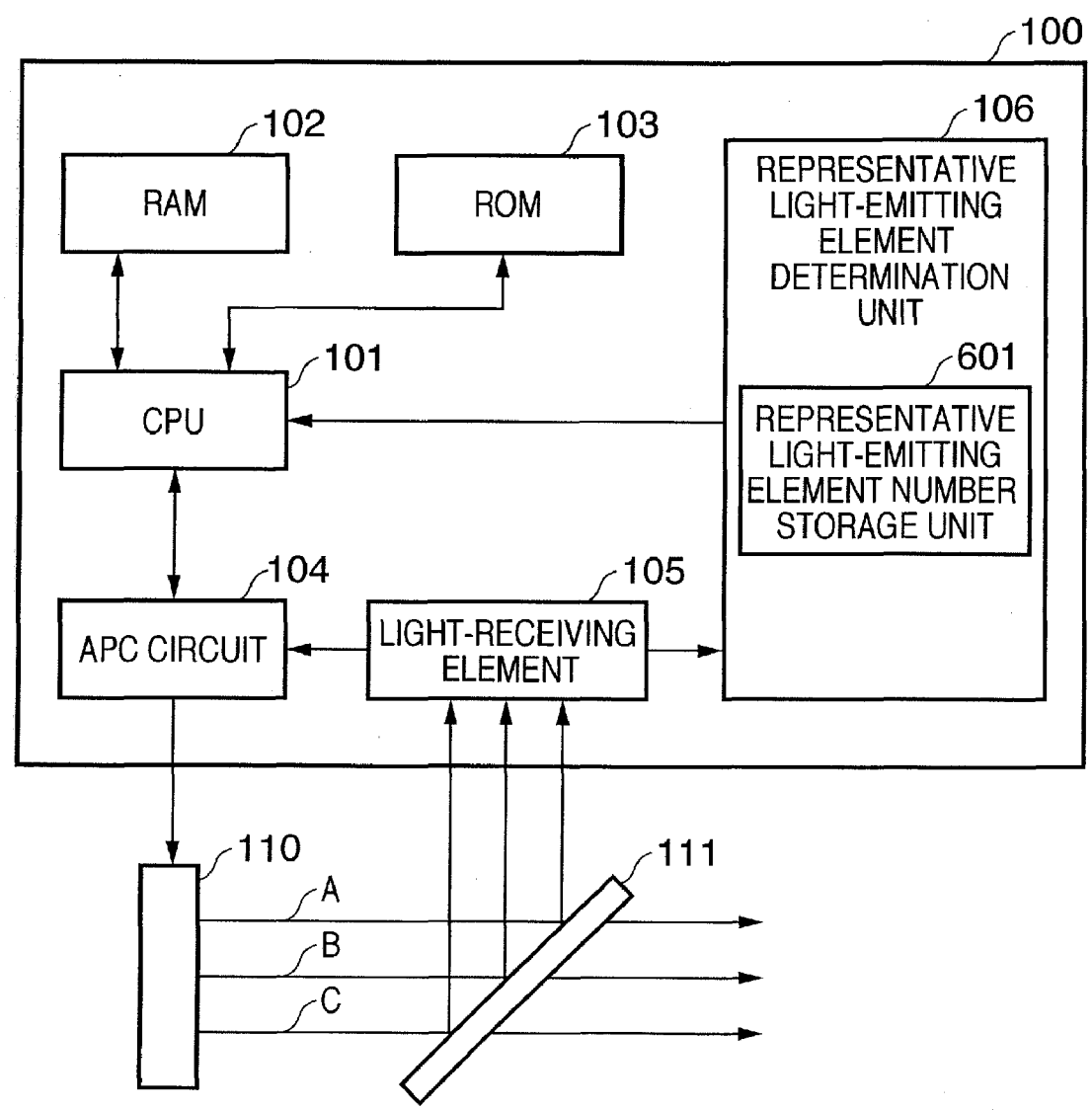
FIG. 6 is a block diagram showing another example of the light power control apparatus according to the embodiment.

FIG. 6 is a block diagram showing another example of a light power control apparatus according to the embodiment. The determination unit 106 includes a storage unit 601 that stores an element number as the identification information of the representative light-emitting element. The storage unit 601 may be the ROM 103.

Figure 7:
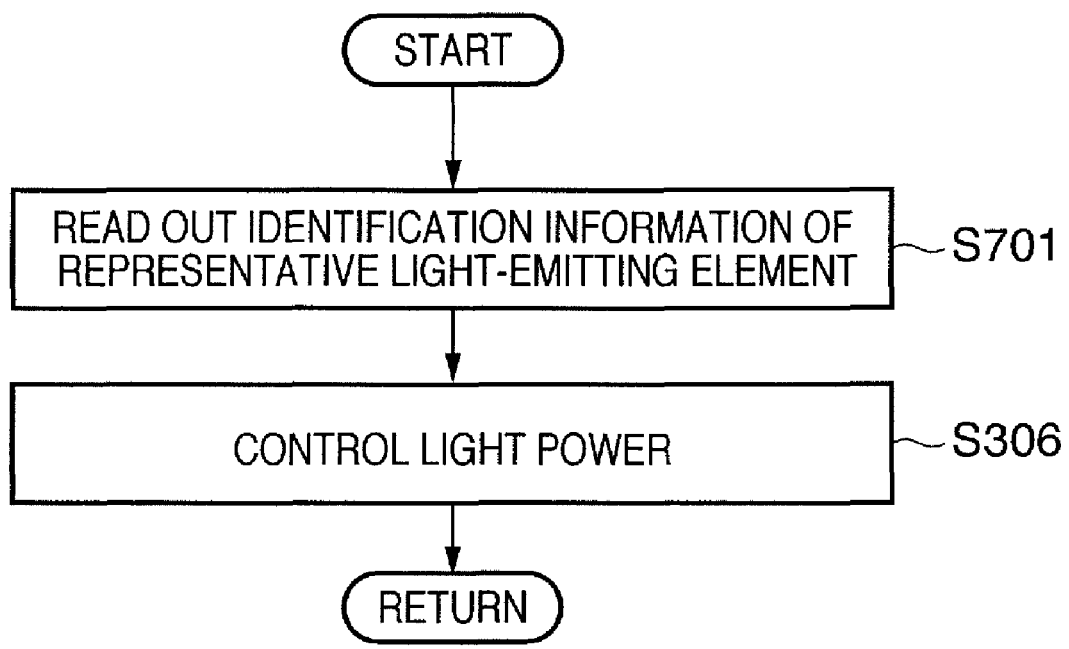
FIG. 7 is an exemplary flowchart illustrating the light power control method according to the embodiment.

FIG. 7 is an exemplary flowchart illustrating the light power control method according to the embodiment. The same step numbers as in the above description denote the same processes. A CPU 101 instructs to start APC control. In step S601, the determination unit 106 reads out the identification information (element number) of the representative light-emitting element from the storage unit 601 and sends it to the CPU 101. In step S306, the CPU 101 instructs an APC circuit 104 to execute light power control using the determined representative light-emitting element. The APC circuit 104 also controls the light powers of the remaining light-emitting elements on the basis of light power data acquired by causing the representative light-emitting element to emit light.

According to the second embodiment, the complex specifying circuit shown in FIG. 4 is unnecessary. Additionally, the control speed is expected to become higher.

Third Embodiment

The above-described embodiments employ a method of specifying a light-emitting element capable of outputting a light beam with a maximum light power from all light-emitting elements provided in the surface emitting laser 110. However, a plurality of light-emitting elements of a surface emitting laser 110 may be divided into two or more groups each including at least one light-emitting element, and a determination unit 106 may determine a representative light-emitting element in each group. The numbers of light-emitting elements included in the groups may be the same or different.

Figure 8:
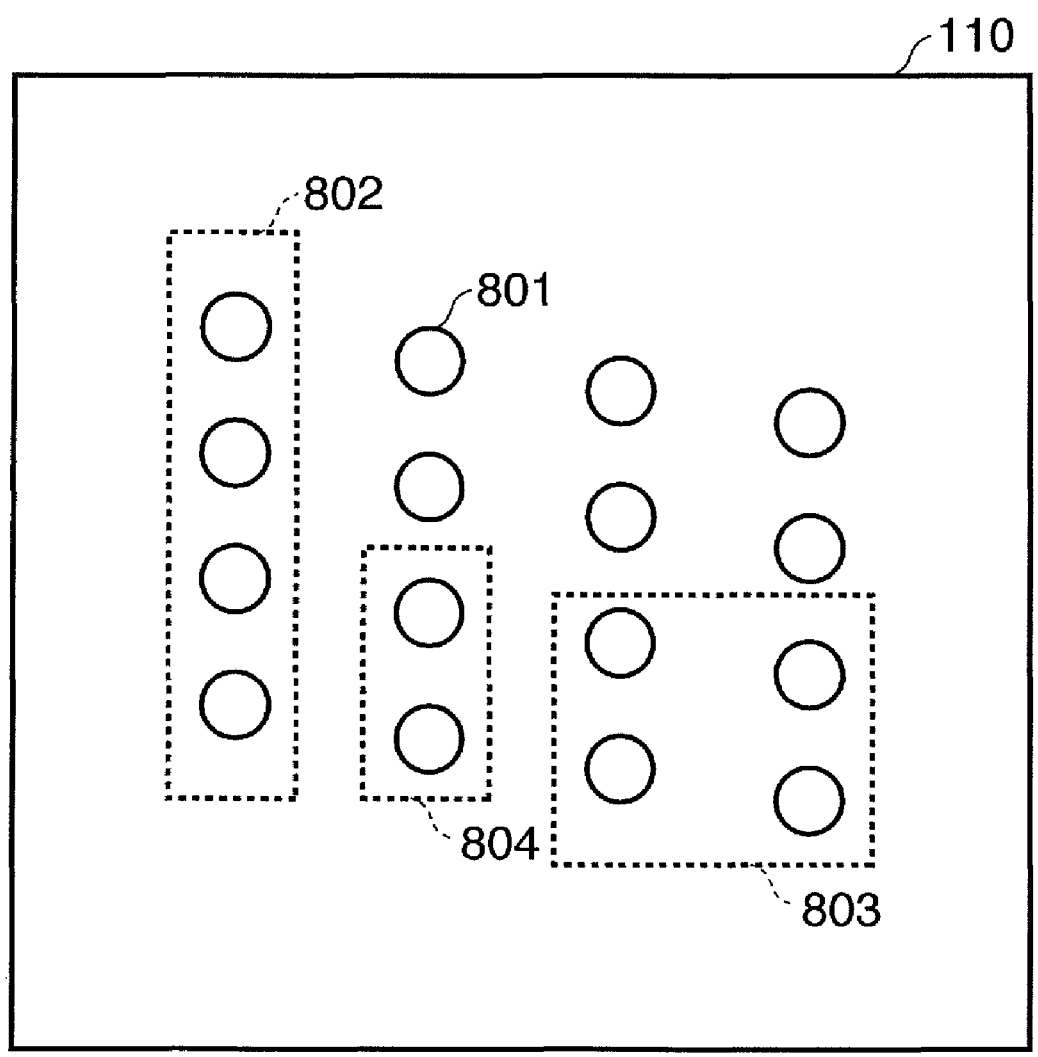
FIG. 8 is a view for explaining the concept of grouping the light-emitting elements included in the surface emitting laser according to the embodiment.

FIG. 8 is a view for explaining the concept of grouping the light-emitting elements included in the surface emitting laser according to the embodiment. Referring to FIG. 8, the surface emitting laser 110 has 16 light-emitting elements 801. A broken line 802 indicates that four light-emitting elements corresponding to one line are put into a group. A broken line 803 indicates that 2×2 light-emitting elements, i.e., a total of four light-emitting elements are put into a group. In either case, four groups are formed. A broken line 804 indicates that two light-emitting elements arranged in the vertical direction are put into a group. In this case, eight groups are formed. FIG. 8 shows three examples of grouping.

When the method of the first embodiment is applied, a representative light-emitting element is determined in each group. When the method of the second embodiment is applied, the identification information of a representative light-emitting element determined in advance in each group is stored in, e.g., a ROM 103. Hence, an APC circuit 104 acquires the current-light power characteristic of the representative light-emitting element of each group and controls the light powers of light-emitting elements belonging to each group. That is, the APC circuit 104 functions as an adjustment unit that adjusts the driving currents of light sources belonging to each group on the basis of the driving current of the representative light source in the group.

According to this embodiment, although the control time slightly increases in accordance with the number of groups, the control accuracy is expected to improve because of the increase in the number of representative light-emitting elements.

Fourth Embodiment

The above-described embodiments employ a method of selecting one light-emitting element capable of outputting a light beam with a maximum light power, as an extreme example. In the present invention, however, it is not always necessary to select a light beam with a maximum light power. For example, the representative light-emitting element may be selected from a light-emitting element that outputs a light beam with a maximum light power when the same current flows to the light-emitting elements and at least one of the remaining light-emitting elements, the light powers of which do not have significant differences from the maximum light power. That is, a determination unit 106 may select, as the representative, a light-emitting element that has almost the same light power as the maximum light power.

Figure 9:
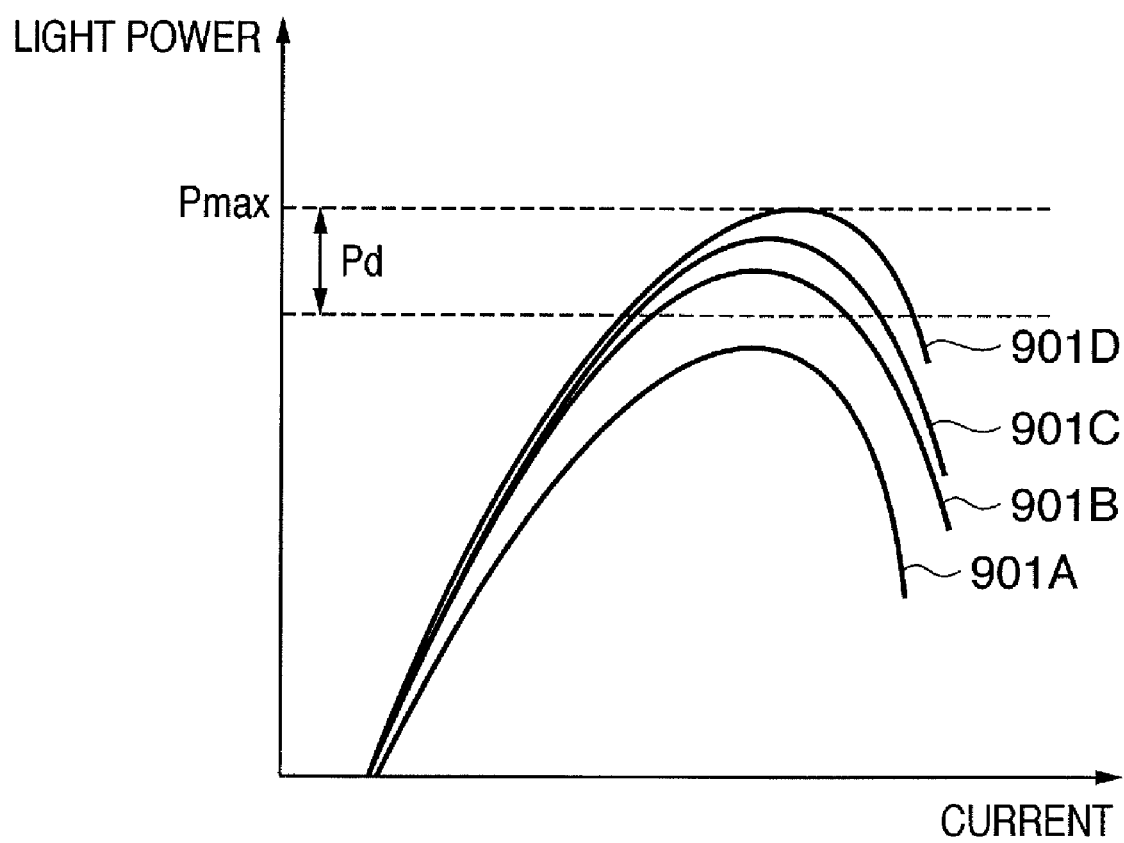
FIG. 9 is a graph showing another example of current-light power characteristics according to the embodiment.

FIG. 9 is a graph showing another example of current-light power characteristics according to the embodiment. FIG. 9 shows current-light power characteristics 901A, 901B, 901C, and 901D of first to fourth light-emitting elements.

Referring to FIG. 9, the peak value (Pmax) of the light power of the fourth light-emitting element is larger than those of the remaining light-emitting elements. As is apparent from this, the fourth light-emitting element can output a light beam with a maximum light power. A difference Pd from the peak value (Pmax) is defined as a control margin. The control margin indicates a peak value range that has no influence on the light power control accuracy. In this case, any light-emitting element having a peak value within the difference Pd can be selected as the representative with almost no adverse effects on the control accuracy.

Hence, a specifying circuit 107 determines, from the peak values of the current-light power characteristics, peak values that fall within the control margin Pd from the maximum peak value and selects an arbitrary or predetermined one of the determined peak values. The specifying circuit 107 may determine the representative light-emitting element on the basis of a random number or in accordance with a predetermined rule.

As described above, in the fourth embodiment, the representative light-emitting element is selected from a light-emitting element that outputs a light beam with a maximum light power when the same current flows to the light-emitting elements and at least one of the remaining light-emitting elements, the light powers of which do not have significant differences from the maximum light power. The fourth embodiment can ensure the same effect as in the first embodiment.

Other Embodiments

The light power control apparatus according to the embodiment can be employed as the exposure apparatus of an image forming apparatus or the light scanning apparatus of an image reading apparatus.

Figure 10:
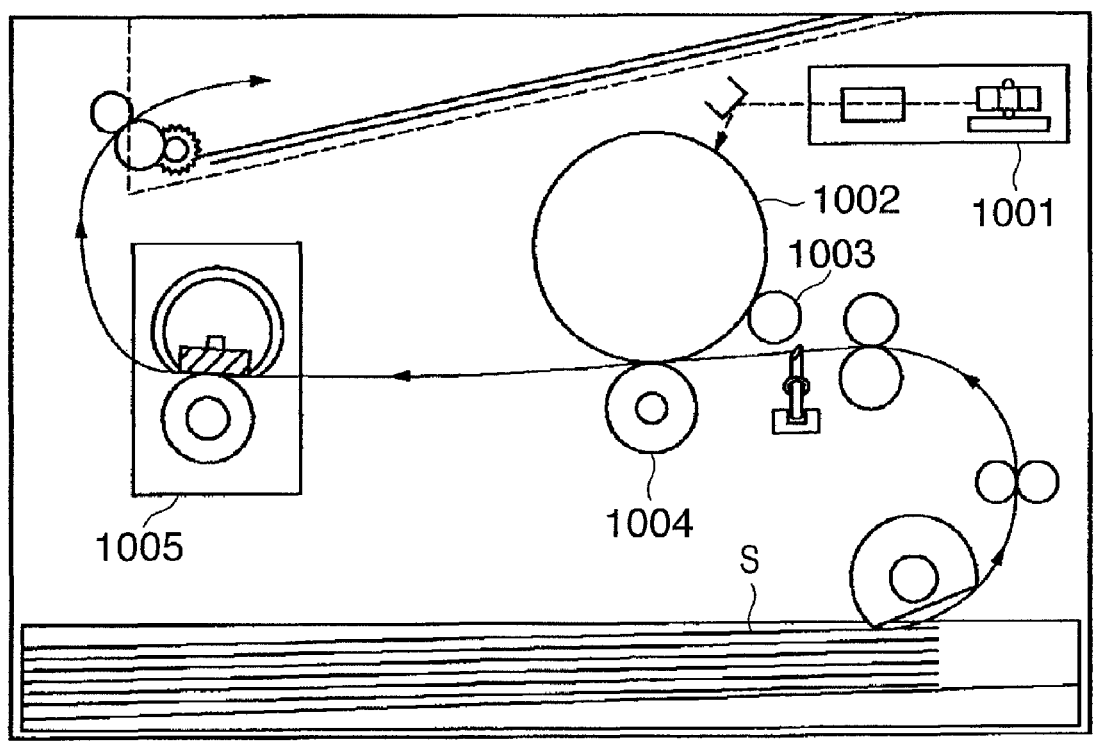
FIG. 10 is a schematic sectional view of an image forming apparatus according to the embodiment.

FIG. 10 is a schematic sectional view of an image forming apparatus according to the embodiment. An exposure apparatus 1001 as an example of a light scanning apparatus irradiates the uniformly charged surface of an image carrier (e.g., photosensitive drum) 1002 with a light beam. A latent image corresponding to a print target image is formed on the surface of the image carrier 1002. A developing unit (e.g., developing roller) 1003 develops the latent image by using a developer. A transfer unit (e.g., transfer roller) 1004 transfers the image of the developer from the image carrier 1002 to a print medium S. A fixing unit 1005 fixes the developer image on the print medium. The image forming apparatus can be commercialized as a copying machine, printer, printing apparatus, facsimile apparatus, or multifunctional peripheral.

Figure 11:
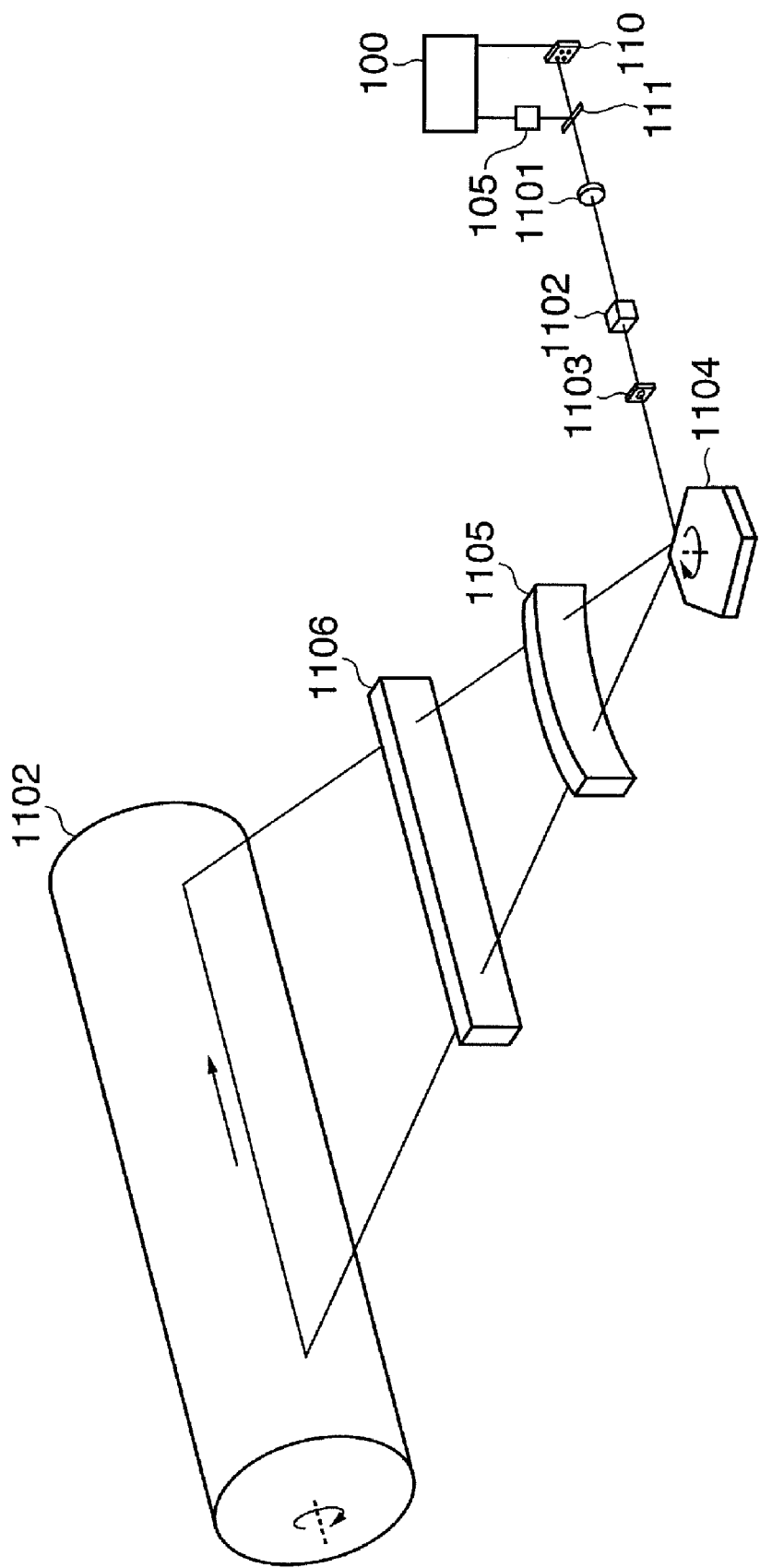
FIG. 11 is a schematic sectional view of an example of an exposure apparatus according to the embodiment.
Figure 12:
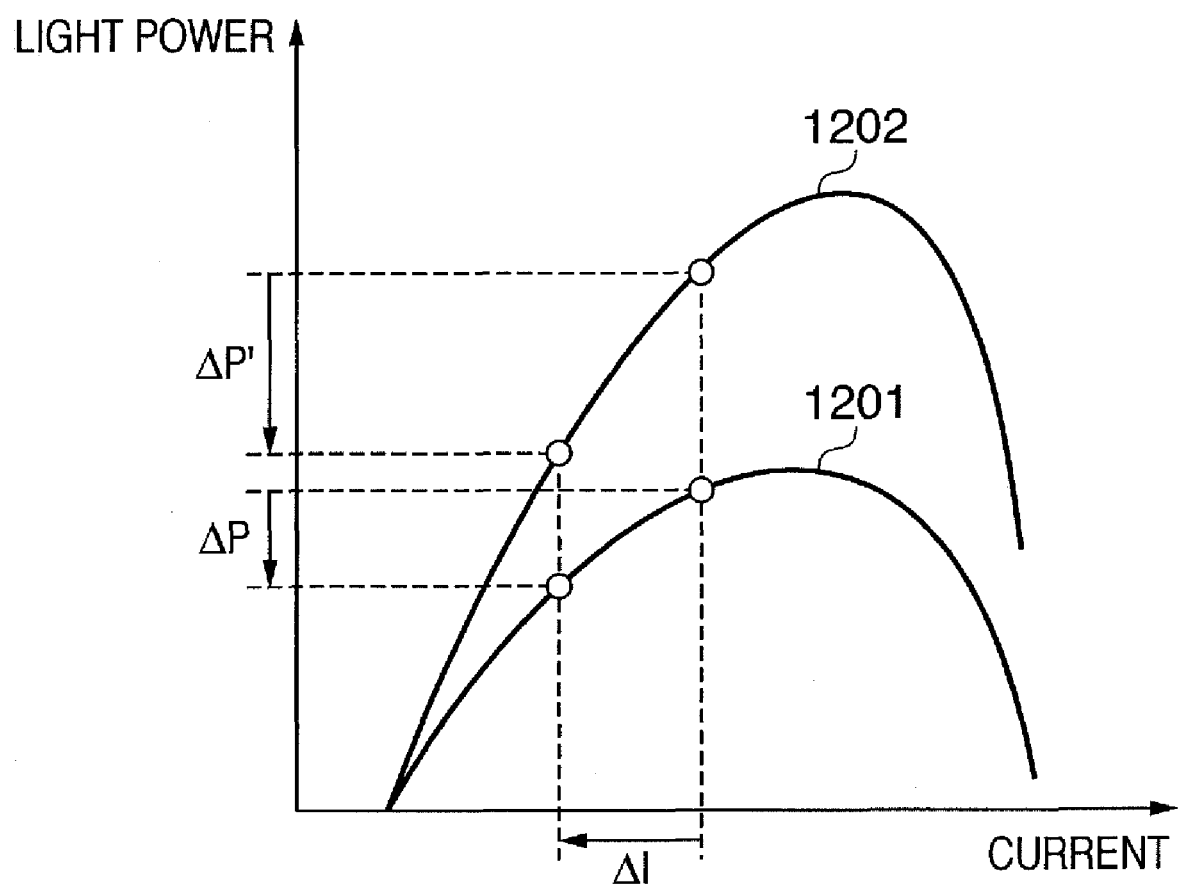
FIG. 12 is a graph showing an example of current-light power characteristics of the light-emitting elements of a surface emitting laser.

FIG. 11 is a view showing an example of the exposure apparatus according to the embodiment. A light beam output from a surface emitting laser 110 passes through a collimator lens 1101, condenser lens 1102, and beam shaping slit 1103 and strikes a rotating polygonal mirror 1104. The light beam reflected by the polygonal mirror 1104 passes through an fθ lens 1105 and a condenser lens 1106 and scans the surface of the image carrier 1002. By repeating the series of operations, an electrostatic latent image is formed on the condenser lens 1102.

Especially, application of the light power control apparatus 100 of this embodiment to the exposure allows to suitably control the light power of each light-emitting element provided on the surface emitting laser 110. Hence, a formed image can maintain a high quality.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-161645, filed Jun. 9, 2006, which is hereby incorporated by reference herein in its entirety.

What is claimed is:

1. A light scanning apparatus comprising:
a plurality of light sources;
a detection unit which detects a light power of a light beam output from at least one of said plurality of light sources; and
a control unit which controls a driving current of at least one selected light source on the basis of a light power detection result of the selected light source such that a light power of the selected light source equals a target light power, the selected light source being selected from said plurality of light sources on the basis of a light-emitting characteristic of each light source,
wherein said control unit controls, on the basis of the driving current of the selected light source, driving currents of light sources which remain unselected in said plurality of light sources,
wherein said plurality of light sources are divided into at least two groups each including at least one light source,
wherein said control unit comprises a determination unit which determines a representative light source of each group, and an adjustment unit which adjusts, on the basis of a driving current of the representative light source in each group, driving currents of remaining light sources belonging to the group, and
wherein said determination unit comprises a specifying unit which specifies, as the representative light source, a light source that outputs a light beam with a maximum light power if the same driving current flows to the light sources.

2. The apparatus according to claim 1, wherein said plurality of light sources are a plurality of lasers included in a surface emitting laser.

3. The apparatus according to claim 2, wherein said surface emitting laser comprises a red surface emitting laser.

4. The apparatus according to claim 1, further comprising a storage unit which stores identification information to specify the light source selected from said plurality of light sources.

5. The apparatus according to claim 4, wherein the light source selected from said plurality of light sources is a light source selected upon shipping from a factory.

6. An image forming apparatus comprising:
- a light scanning apparatus including a plurality of light sources, a detection unit which detects a light power of a light beam output from at least one of said plurality of light sources, and a control unit which controls a driving current of at least one selected light source on the basis of a light power detection result of the selected light source such that a light power of the selected light source equals a target light power, the selected light source being selected from said plurality of light sources on the basis of a light-emitting characteristic of each light source;
- an image carrier on which a latent image is formed by said light scanning apparatus;
- a developing unit which develops the latent image on said image carrier to a developer image;
- a transfer unit which transfers the developer image onto a print medium; and
- a fixing unit which fixes the transferred developer image onto the print medium,
- wherein said control unit controls, on the basis of the driving current of the selected light source, driving currents of light sources which remain unselected in said plurality of light sources,
- wherein said plurality of light sources are divided into at least two groups each including at least one light source,
- wherein said control unit comprises a determination unit which determines a representative light source of each group, and an adjustment unit which adjusts, on the basis of a driving current of the representative light source in each group, driving currents of remaining light sources belonging to the group, and
- wherein said determination unit comprises a specifying unit which specifies, as the representative light source, a light source that outputs a light beam with a maximum light power if the same driving current flows to the light sources.

* * * * *